United States Patent [19]

Worringer

[11] 4,351,556
[45] Sep. 28, 1982

[54] SEAT SUSPENSION

[75] Inventor: Thomas J. Worringer, Wauwatosa, Wis.

[73] Assignee: Allis-Chalmers Corporation, Milwaukee, Wis.

[21] Appl. No.: 105,631

[22] Filed: Dec. 20, 1979

[51] Int. Cl.³ .............................................. B60N 1/00
[52] U.S. Cl. ..................................... 296/63; 248/424; 248/559
[58] Field of Search .................. 296/63; 248/559, 638, 248/424, 429, 430

[56] References Cited

U.S. PATENT DOCUMENTS

| 3,322,379 | 5/1967 | Flannelly | 248/559 |
| 3,685,780 | 8/1972 | Stannebein | 248/430 |
| 3,711,149 | 1/1973 | Carter | 296/63 |
| 3,957,243 | 5/1976 | Costin et al. | 248/430 |

FOREIGN PATENT DOCUMENTS

| 1026358 | 4/1966 | United Kingdom | 248/559 |
| 1190689 | 5/1970 | United Kingdom | 296/63 |
| 1282213 | 7/1972 | United Kingdom | 296/63 |

Primary Examiner—Joseph F. Peters, Jr.
Assistant Examiner—Ross Weaver
Attorney, Agent, or Firm—Arthur L. Nelson

[57] ABSTRACT

A horizontal seat suspension for a vehicle for isolating horizontal ride vibrations for low frequencies normally found in large tractors, or other off the road vehicles, a provision for adjusting the seat to a desired position, and also a provision for selectively locking or activating the horizontal suspension.

10 Claims, 4 Drawing Figures

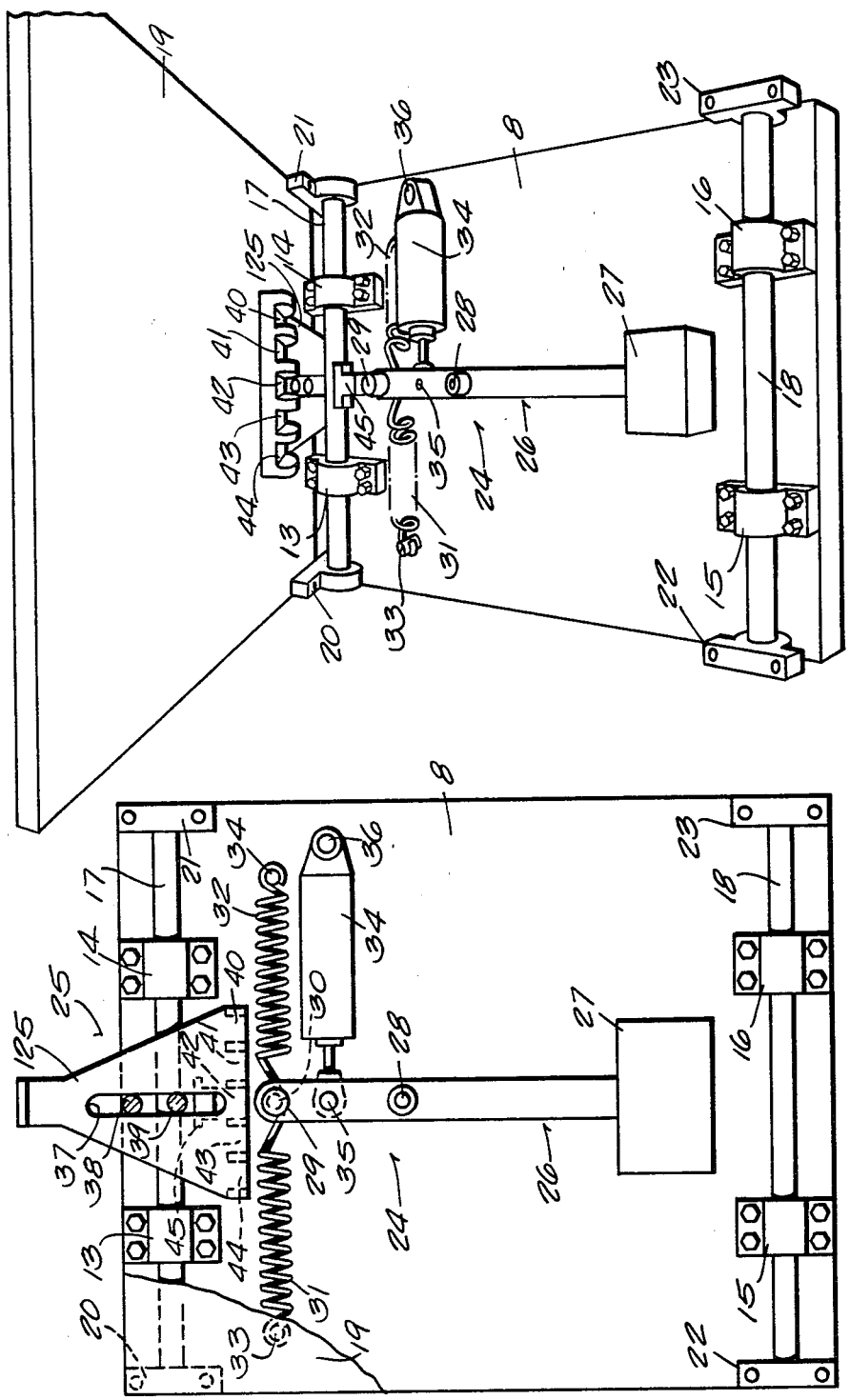

SEAT SUSPENSION

This invention relates to a vehicle seat and more particularly to a tractor seat suspension to isolate the seat from the chassis for low frequencies vibrations of the vehicle chassis by a horizontal seat suspension on the vehicle.

The vehicle seat is normally fixed with the vehicle chassis so that it moves horizontal with the movement of the chassis. The unevenness of terrain causing bouncing of the seat is cushioned by springs and shock absorbers, essentially this movement is in a vertical direction. While it is advantageous to isolate the seat from the vibrations of the vehicle chassis in a vertical direction, it is also an advantage to be able to isolate the horizontal vibrations of the seat and provide a smoother ride. Accordingly, this seat provides for the isolation of vibrations in the horizontal direction with the use of a counterweight, springs and a shock absorber. The isolation of the seat begins in a low frequency wave band in which high energy transmission is normally present in large tractors. The isolation of the vibrations in a horizontal direction improves the ride. A provision is also incorporated in the suspension, whereby the seat may be locked to the vehicle chassis in the horizontal direction.

Accordingly, it is an object of this invention to provide a horizontal suspension system for isolating the tractor seat from the vehicle chassis.

It is another object of this invention to provide a horizontal suspension system having a counterweight, damper, and springs to isolate the seat from the vehicle chassis in a horizontal direction.

It is a further object of this invention to provide a horizontal seat suspension for isolating the vehicle seat from horizontal vehicle chassis vibrations. The isolation is accomplished over a wide band width to isolate the seat from the chassis in a horizontal direction.

The objects of this invention are accomplished by providing a seat suspension system having horizontal reciprocating movement. A provision for locking the seat in one of a selected number of fore aft positions is also provided. A provision for locating the seat in a number of fore aft positions while allowing the isolator to operate is also provided. The horizontal suspension system provides for a combination of a counterweight, a damper and springs to selectively isolate the seat from the vehicle chassis. The isolation of the seat is predominately in the low band frequencies through a suspension system which has a low resonant frequency and also isolates at an antiresonant frequency immediately above the resonant frequency to improve isolation performance. Suspension system for the seat has a low transmissibility in this band width of frequencies. Accordingly, the isolating suspension system provides an improved ride since the energy is dissipated in the suspension system and the operator does not feel the vibrations of the vehicle chassis.

Referring to the drawings, the preferred embodiment of this invention is illustrated.

FIG. 1 illustrates a partial cross-section view showing seat structure carried on the vehicle chassis and a portion of the seat structure carried with the seat pad. The partial cross-section view shows the relative position of the various parts;

FIG. 2 is a view showing the underside of the seat pad and the components moving with the seat pad of the vehicle seat and the suspension system;

Figure 3:
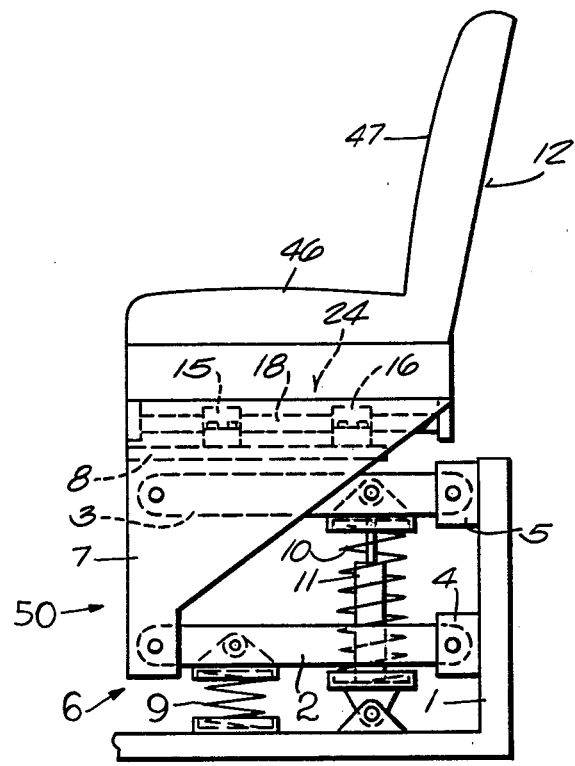
FIG. 3 is a side elevation view of the seat showing a portion of the connecting structure between the seat pad and the seat structure carried on the vehicle chassis.

Referring to the drawing, FIGS. 1, 2 and 3 show the structure of the seat. The vehicle chassis 1 supports the parallel linkage which include the two arms 2 and 3 pivotally mounted the support abutments 4 and 5. The parallel linkage 6 of which the links 2 and 3 are shown, is also pivotally connected to the support bracket 7 which supports the plate 8. The vertical suspension system includes the spring 9 connected to the lower arm 2 and the spring 10 and shock absorber 11 for supporting the seat and isolating vertical vibration and dampening of vertical vibration between the chassis 1 and seat 12.

The horizontal suspension system is essentially shown in FIG. 1 and FIG. 2. The plate 8 carries four linear bearings 13, 14, 15 and 16. The linear bearings 13 and 14 carry the shaft 17, while the linear bearings 15 and 16 carry the shaft 18. The linear bearings are mounted on the plate and provide a supporting structure for the shaft 17 and 18. The shaft 17 and 18 are carried on the plate 19. The shaft 17 is connected through the brackets 20 and 21, while the shaft 18 is connected through the brackets 22 and 23 to plate 19. Accordingly the shaft 17 and 18 can move axially in the linear bearings. They are restrained, however, by the horizontal suspension system 24 or the latch mechanism 25. Either of these mechanisms are selectively engaged to control the horizontal movement of the seat in the linear bearings. The suspension system 24 includes a weighted lever 26 carrying the weight 27 on its extreme end. The lever 26 is pivotally supported on the pin 28 and extends to support a cam roller 29, spring support 30, on the end of the lever 26. The springs 31 and 32 are connected to the pin 30 and are also fastened on their extreme ends by a pin 33 and 34. The springs 31 and 32 are springs of equal tension and spring rate and bias the lever 26 to the transverse or neutral position normal to the shaft 17 and 18 as shown. The lever 26 can be moved against the biasing force of the springs 31, 32 but normally returns to the neutral position as shown.

The shock absorber 34 is pivotally connected by the pin 35 on the lever 26 and also pivotally connected by the pin 36 on its opposite end to the plate 8. The shock absorber 34 provides a damping means tending to resist the angular velocity of the lever.

The latch 25 is formed with a slot 37 which receives the two pins 38 and 39 which are fastened to the plate 19. The latch 25 is selectively positioned in the extreme downward position as viewed in FIG. 1 for engaging the horizontal suspension system, wherein the cam roller 29 engages one of the latch openings 40, 41, 42, 43 and 44. When the cam roller 29 is positioned in one of the latch openings the plate 19 and seat pad of seat 12 is controlled by the horizontal suspension system 50.

When the latch 25 is moved to the upper position, as viewed in FIG. 1, with the pins in the extreme end of the slot 37 the latch openings 40, 41, 42, 43, or 44, then engage the abutment 45 which is fixed to the plate 8. This locks the seat 12 with plate 8 and the seat moves with the chassis, and the fore aft isolation suspension is locked out if desired.

The seat, as shown in FIG. 3, provides for selectively operation for isolation of horizontal vibrations fore and aft as described above. The seat normally operates for isolation of vibrations from the vehicle chassis to the seat through a vertical suspension system 50, as shown.

Figure 4:
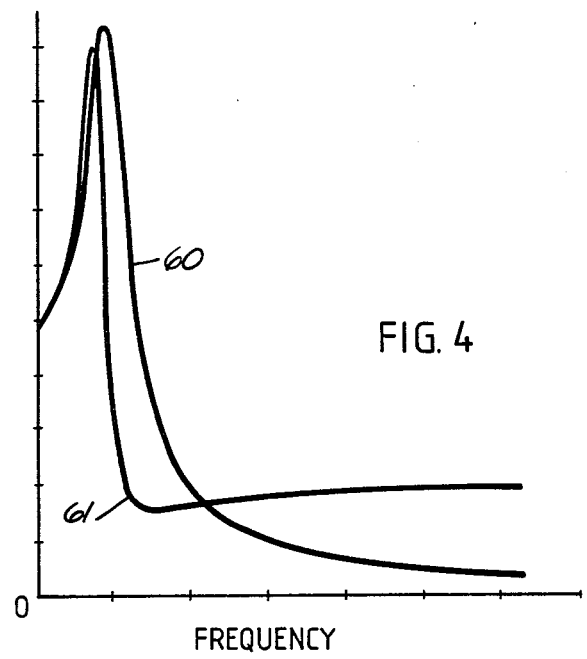
FIG. 4 illustrates a graph showing the transmissibility of frequencies with a conventional fore aft seat suspension and with the fore aft seat suspension of the applicant's design.

To illustrate the operation and purpose of the suspension system, the graph shown on FIG. 4 is included. A conventional fore aft seat suspension with shock absorbers and springs used to dampen the vibration transmission from the vehicle chassis to the seat is shown on the graph by line 60. The graph line 61 shows the operation of the applicant's invention. It is noted from the transmissibility curve that the applicant's design begins to isolate at a lower frequency than that of the conventional seat. This point is at a frequencie immediately above the resonant frequencies for which transmissibility is very high. With the conventional seat transmissibility decreases much more slowly. Accordingly, the frequencies in which high human sensitivity to vibration the vehicle chassis to the seat is approximately 1.0–2.5 Hertz. With the design of the applicant's invention, the transmissibility is low for these frequencies, thereby essentially isolating the seat from the vehicle chassis.

Accordingly, with the design of the applicant's invention, the isolating range can be extended to a lower frequency without shifting the resonant frequency to an impractically low value. Thus, isolation in the 1.0–2.5 Hertz range, as required in off the road vehicles can be accomplished.

The operation of the device will be described in the following paragraphs.

The seat 12 is mounted on a vertical suspension system 50 and also a horizontal suspension system 24. This application primarily concerns itself with a horizontal suspension system and isolation of the seat from the vehicle chassis.

The vehicle seat 12 can be locked in position so that the seat does not move fore and aft relative to the chassis. The locking is accomplished by the latch bracket 25 which is moved in the position so that the abutment 45 is received in one of the slots 40, 41, 42, 43 or 44. In this position, the suspension system is not used and the seat moves fore and aft with movements of the vehicle chassis. Accordingly, there is no isolation between the seat and chassis.

If isolation is desired, the latch bracket 25 is moved to the position in which the roller 29 of the weighted lever 26 is received in one of the slots 40, 41, 42, 43, or 44. Since the latch bracket 25 is connected to the plate 19 under the seat pad 46, the seat pad is then moved in response to movement of the horizontal suspension system 24. Vibrations of the vehicle chassis are transmitted to the horizontal suspension system 26. Horizontal suspension 26 largely dissipates the vibrations above 1.0 Hertz. The vibrations are largely dissipated by the horizontal suspension system 24 by and springs the combined action of suspended mass counterweight and cancel each other out. The operator in the seat does not sense the the magnitude of vibrations being transmitted from the vehicle chassis to the horizontal suspension system 24, and accordingly, an improved ride is achieved with a suspension system as shown.

The embodiment of the invention in which an exclusive property or privilege is claimed are defined as follows:

1. A horizontal vehicle seat suspension system on a vehicle comprising, a vehicle chassis, a seat, a seat suspension system on said vehicle chassis permitting horizontal movement of said seat relative to said chassis including, an inertia lever pivotally mounted on said vehicle chassis, resilient means normally biasing said inertia lever to a neutral position, a latch means selectively and alternatively connecting said inertia lever to said seat and locking said seat to said chassis, said suspension system thereby causing inertia forces and spring forces to absorb vibration energy with a minimum of vibrations being transmitted across said suspension system at predetermined frequencies from said chassis to said seat.

2. A horizontal vehicle seat suspension system on a vehicle as set forth in claim 1, including a damper connected to said lever and said chassis dampening the movement of said lever.

3. A horizontal vehicle seat suspension system on a vehicle as set forth in claim 1 including, a latch reciprocally mounted on said seat selectively positioning said seat in a locked position on said vehicle chassis restraining fore and aft movement of said seat relative to said chassis and connecting said seat to said suspension system.

4. A horizontal vehicle seat suspension system on a vehicle as set forth in claim 1 wherein said latch means defines a plurality of stop positions for selectively positioning said seat in a plurality of position stops adjusting the fore and aft position of said seat relative to said chassis.

5. A horizontal vehicle seat suspension system on a vehicle as set forth in claim 1 including, reciprocating rails and linear bearings for controlling the seat movement in a fore and aft direction relative to said vehicle chassis.

6. A horizontal vehicle suspension system on a vehicle as set forth in claim 1 including, means pivotally supporting said inertia lever on a vertical axis on said vehicle chassis.

7. A vehicle seat suspension system on a vehicle as set forth in claim 1 including, a weight positioned on one end of said inertia lever, a cam positioned on the other end of said inertia lever adapted for engaging a cam follower, a seat latch on the seat defining the cam follower, means for selectively and alternatively positioning said cam follower for engaging said cam for initiating operation of said horizontal suspension system and engaging said lock for selectively locking said seat in a locked position relative to said vehicle chassis.

8. A horizontal vehicle seat suspension system on a vehicle as set forth in claim 1 including, a weight on the end of said inertia lever.

9. A vehicle seat suspension system on a vehicle as set forth in claim 1 wherein said latch means includes a latch element reciprocally mounted on said seat and defining a slot for receiving pins for fastening said latch element to said seat, a roller defining a cam on said inertia lever adapted for engaging said latch element, an abutment on said vehicle chassis adapted for engaging said latch element thereby selectively engaging said suspension system and said seat lock.

10. A horizontal vehicle seat suspension system on a vehicle as set forth in claim 1 including, means defining a vertical axis for pivotally supporting said inertia lever on said vehicle chassis, a damper connected between said lever and said vehicle chassis for damping movement of said lever from a neutral position, at least two springs mounted in parallel biasing said inertia lever to a neutral position thereby providing inertia forces and spring forces to dissipate vibration energy transmitted from said vehicle chassis toward said seat.

* * * * *